Patented Mar. 28, 1950

2,502,003

UNITED STATES PATENT OFFICE 2,502,003

ALCOHOL-SOLUBLE ARALKYL-PHENOLIC CONDENSATION PRODUCT

Lyle M. Geiger, Edgewood, Pa., assignor to The Neville Company, Pittsburgh, Pa., a corporation of Pennsylvania No Drawing. Application April 6, 1945, Serial No. 587,011

3 Claims. (Cl. 260—62)

This invention relates to alcohol-soluble resins produced by the interaction of aromatic vinyl compounds and phenolic compounds, and to methods for their production.

Aromatic vinyl-phenol resins have been made by treating a mixture of an aromatic vinyl compound and a phenol, commonly in an inert solvent, with a catalyst which promotes the condensation and polymerization reactions. As aromatic vinyl compounds, styrene and derivatives of it have been used. Various phenolic compounds have been applied to this end, examples being ordinary phenol, cresol, the naphthols, and various substituted phenols. The catalysts that have been used for this purpose include various materials that are capable of splitting off acid or acid-reacting substances; also different types of activated clay, bleaching earth and the like materials. Commonly, large quantities of vinyl compound, usually as much as ten times the molecular quantities of the phenol, have been reacted.

All of the resins produced in such manner have been characterized by solubility in raw and treated varnish oils, turpentine, and in most aromatic and petroleum hydrocarbons, and hence they have been proposed as constituents of paints, varnishes, lacquers, and other coating compounds. Those prior art materials have varied widely in properties, ranging from oily liquids to solid resins, and in color from extremely light to very dark. Disadvantageously, however, all of them are insoluble in alcohols, such, for example, as methanol, ethanol, propanol, isopropanol, and the like, and they are incompatible with cellulose derivatives and zein, so that they can not be applied to uses to which they are otherwise well fitted.

A primary object of this invention is to provide phenol-modified aromatic vinyl resins, or resinous bodies, that are completely alcohol soluble.

A further object is to provide a method of making resins by interaction of aromatic vinyl compounds and phenols which is simple, is easily practiced, and is productive of satisfactory yields of light-colored resins that are completely soluble in alcohols.

Yet another object is to provide phenol-modified aromatic vinyl resinous bodies that are both completely soluble in alcohols and also fully compatible with cellulose derivatives and proteins, such as zein, casein, gluten and the like, that are usually incompatible with resinous hydrocarbons.

Still another object is to provide a simple, easily performed and efficient process of making resins in accordance with the immediately preceding object.

Other objects will appear hereinafter.

The term "solubility in alcohol" as used herein refers to the ability to cool a 20 per cent by weight solution of the resin in anhydrous methanol, ethanol, propanol or isopropanol to 5° C. without precipitation. The 20 per cent concentration refers to a solution containing that amount of resin at normal room temperatures. This standard is applied because experience has shown that a mere trace of alcohol-insoluble material will be precipitated under these conditions.

I have discovered, and it is upon this that the invention is in large part predicated, that its objects are attained by effecting reaction between an aromatic vinyl compound and a phenolic body under the influence of a particular catalyst while observing certain critical conditions. More particularly, the invention is predicated in part upon the use of a boron trifluoride catalyst, either pure or in the form of molecular compounds with organic acids, ethers, alcohols, or phenols.

An important feature of the invention resides in my discovery that control of the mol ratio of the vinyl compound to the phenol is necessary in order to produce alcohol soluble products. For the best results the aromatic vinyl compound and the phenol should be reacted in substantially equimolecular proportions. In this case, and if another important factor presently to be described is observed, the resulting product is both alcohol soluble and also compatible with materials such as cellulose acetate and zein; additionally it is soluble in hydrocarbons and oils. Thus the field of useful application of phenol-modified aromatic vinyl resins is greatly extended. If there is substantial departure from the proportion of one mol of the aromatic vinyl compound to one mol of the phenol, the reaction is unfavorably influenced, as I have discovered. Excess of phenol over that proportion does not render the product insoluble in alcohol, but the yield of resin is lowered. On the other hand, excess of vinyl compound does not reduce the yield but affects the alcohol solubility detrimentally. On reacting, for example, three mols of an aromatic vinyl compound with one mol of a phenol, the resulting product is generally alcohol soluble, but no longer compatible with cellulose acetate or zein. Furthermore, when five mols of an aromatic vinyl compound are reacted with one mol of a phenol, even in the presence of a boron trifluoride type catalyst, alcohol-insoluble resins are formed which are of course, incompatible with cellulose acetate or zein, and such products are characteristic of those known prior to my invention.

I have discovered further, and the invention is particularly predicated on this, that to produce completely alcohol-soluble products, it is necessary to add the aromatic vinyl compound progressively, and preferably slowly, to a previously prepared mixture of the phenol and the catalyst, most suitably heated to an appropriate temperature. Other ways of mixing the reactants and the catalyst result in products of decreased alcohol solubility. Thus, mixing the reactants (aromatic vinyl compound and a phenol) in the required quantities with the catalyst and heating, or adding the catalyst at once or in portions, to such a mixture of the reactants, (both procedures being typical of the prior art), results in products of extremely poor alcohol-solubility.

Although I do not limit myself to this explanation, it seems reasonable to suppose that these results are due to the following considerations. In the first place, the aromatic vinyl compound and the phenol may condense, with formation of an alcohol-soluble condensate. Second, the aromatic vinyl compound may, however, polymerize without undergoing any phenolic involvement, and this will occur with the same catalyst used for effecting the condensation reaction. It is an established fact that the unmodified aromatic polyvinyl compounds are completely insoluble in alcohol. The prior art methods of producing phenol-modified aromatic polyvinyl resins, which have been consistently of extremely poor alcohol-solubility, is due, I believe, to the fact that although both of these mechanisms or reactions have occurred, the initial relatively high concentration of aromatic vinyl compound results in simple polymerization of vinyl compound to an extent such that although the end product is a mixture of an unmodified aromatic polyvinyl compound and a phenol modified polyvinyl compound, it is alcohol insoluble inasmuch as the aromatic polyvinyl compounds are alcohol-insoluble. Apparently, however, when the aromatic vinyl compound is added slowly to the mixture of phenol and catalyst, in accordance with the present invention, the high concentration of phenol relative to the aromatic vinyl compound at the moment the latter is added, favors the condensation reaction, and may even exclude simple polymerization of aromatic vinyl compounds without phenolic involvement, and thus results in a completely alcohol-soluble product.

It is imperative, however, to use catalysts of the boron trifluoride type exclusively, since they promote the condensation reaction very actively, a quality not found in other catalysts known to me. The boron trifluoride catalysts are mixed with the phenol. As a result of the fact that boron trifluoride itself is a gas, it is convenient to use as a catalyst a solid or liquid molecular compound of boron trifluoride, either pure or dissolved in a suitable inert solvent. Thus, I may use the crystalline molecular compound of boron trifluoride and isopropyl ether, which is suitably dissolved in benzene, or other inert solvent, in a quantity of, for example, 33 per cent by weight, or I may use the liquid molecular compounds of boron trifluoride and organic ethers, acids, alcohols or phenols. Satisfactory results are usually to be had by using the catalyst, calculated as boron trifluoride, in an amount between about 0.4 and 0.6 per cent by weight of the quantity of phenol.

The condensation reaction is suitably carried out at temperatures of about 60° to 70° C. Other temperatures of reaction may, of course, be used, but lower temperatures result in slower reaction rates, while appreciably higher temperatures tend to produce darker products.

The aromatic vinyl compound may be added progressively and slowly to a simple solution of the catalyst in the phenol, with continuous agitation. In some instances, however, the viscosity of the reaction body may rise rapidly as the concentration of the reaction product increases, with the necessity for using excessive power to maintain the agitation necessary for adequate distribution of the continuously added vinyl compound throughout the liquid. Therefore, it is commonly preferable to use an inert diluent such, for example, as petroleum benzene or an aromatic hydrocarbon solvent. The phenol used may be initially dissolved in such a diluent and the catalyst added to the solution, or, if preferred, the diluent may be added all at once, or progressively, as the reaction proceeds, or even after it has been completed.

The progressive addition of the aromatic vinyl compound to the mixture of phenol and catalyst, either pure or in solution, is preferably carried out continuously, usually over an extended period of time, e. g., one hour, while the reaction mixture is continuously agitated to ensure a homogenous distribution of the reactants throughout the liquid and to aid in maintaining control of temperature through more rapid heat transfer.

After the reaction has been completed, the catalyst is removed by agitating the reaction mixture for about one-half hour at from 10° to 70° C. with an adsorbent, examples being fuller's earth, bauxite products such as "Porocel," or a clay such as Attapulgus clay, either alone or mixed together, after which the minerals are filtered off. Unreacted materials and solvent are then distilled off by heating the liquid, e. g., to 250° C., while passing steam through it, and recovering the fluid resin. The remaining fluid resin may be separated, if desired, by steam or high vacuum distillation into a resinous oil and a solid resin, both of which are alcohol-soluble, have light colors, and are formed in good yields.

The invention may be understood further with reference to the following examples; in which all proportions are by weight.

*Example 1*

310 parts of phenol were heated at 60 to 70° C. with 27 parts of a 33⅓ per cent (by weight) solution of the complex $BF_3(C_3H_7)_2O$ in benzene. 312 parts of styrene were then added over a period of one hour, while the reaction mixture was agitated. After removal of the catalyst with the aid of Attapulgus clay, (50 parts) and subsequent purification, a resinous oil was obtained in a 66.3 per cent yield; it was soluble in methanol and compatible with cellulose acetate and zein, and it had the following properties:

Specific gravity @ 30/15.6°
  C_____ 1.08
Refractive index @ 25° C__ 1.599
Boiling range_____ Entirely above 300° C.
Viscosity @ 25° C_____ 15 poises
Color_____ 1/4 (Barrett scale)

As exemplifying the utility of the resinous and alcohol-soluble products of this invention, reference may be made to the following compositions.

20 to 25 parts by weight of the product of Example 1 were compounded with 50 parts of proprietary alcohol and 25 to 30 parts of zein. The lacquer thus made produced films that were flexible and relatively colorless, and which exhibited retention of those properties upon exposure. Moreover, one of the important effects of the products of this invention when compounded with zein is to provide water resistant coatings that are likewise oil and grease resistant. Equally important is their effect in inhibiting greatly the embrittling on aging that is characteristic of other zein lacquers.

Another typical composition that has been made had the following composition:

| | Parts |
|---|---|
| Cellulose acetate LH-1 | 12 |
| Product of Example 1 | 8 |
| Methyl ethyl ketone | 75 |
| Methyl Cellosolve | 10 |
| Proprietary alcohol | 5 |
| Butyl acetate | 10 |

*Example 2*

310 parts of phenol were heated at 60 to 70° C. with 13.5 parts of a 33½ per cent (by weight) solution of the complex $BF_3(C_3H_7)_2O$ in benzene. 312 parts of styrene were added over a period of 50 minutes, while the mixture was agitated. The viscous mixture was diluted with 200 parts of benzol and the catalyst was removed with the aid of 25 grams of Attapulgus clay. After purification, a resinous oil was recovered, in a yield of 66 per cent, that was soluble in methanol and compatible with cellulose acetate and zein.

In the following Examples 3 and 4 it is shown that when 3 mols of an aromatic vinyl hydrocarbon are reacted with one mol of a phenol, alcohol-solubility is retained but compatibility with cellulose acetate and zein is lost.

*Example 3*

47 parts of phenol were heated at 60 to 80° C. with 4.5 parts of a 33⅓ per cent (by weight) solution of the complex $BF_3(C_3H_7)_2O$ in benzene, while the mixture was agitated. 150 parts of styrene were added, over a period of 50 minutes. Afterwards 88 parts of benzene were added and the catalyst was removed with 10 grams of Attapulgus clay. After purification a light yellow, very viscous resinous oil was obtained, in a quantity of 85.4 per cent, that was soluble in methanol but incompatible with zein or cellulose acetate.

Other phenols also react with aromatic vinyl hydrocarbons and yield alcohol-soluble products, as can be seen from Example 4.

*Example 4*

56 parts of commercial cresylic acid were heated at 70 to 80° C. with 4.5 parts of a 33⅓ per cent solution (by weight) of the complex $$BF_3(C_3H_7)_2O$$

in benzene. The mixture was agitated and 156 parts of styrene were added over a period of 40 minutes. Afterwards 88 parts of benzene were added and the catalyst was removed with 10 parts of Attapulgus clay. After purification a yellow, extremely viscous resinous oil was obtained in a 79.8 per cent yield, and soluble in alcohol, but incompatible with cellulose acetate and zein.

*Example 5*

310 parts of phenol were heated at 60 to 70° C. with 10 parts of the molecular complex of boron trifluoride and acetic acid, formed by saturation of glacial acetic acid with boron trifluoride. 312 parts of styrene were added over a period of one hour, while the reaction mixture was agitated. After removal of the catalyst with 25 parts of Attapulgus clay and subsequent purification, a resinous oil was obtained in 85 per cent yield, soluble in methanol and compatible with cellulose acetate and zein.

*Example 6*

310 parts of phenol were heated at 60 to 65° C. with 10 parts of a saturated solution of boron trifluoride in isopropyl ether. 260 parts of alpha methyl styrene were added over a period of 2½ hours, while the reaction mixture was agitated. After removal of the catalyst with 50 parts of Attapulgus clay, a viscous liquid of a light amber color was obtained by distillation, soluble in alcohol, and compatible with cellulose acetate and zein.

*Example 7*

122 grams of alpha-methyl, para-methyl styrene were added dropwise to 94 grams of phenol containing 2 cc. of boron trifluorideisopropyl ether catalyst. The temperature was maintained at 60 to 65° C. by the rate of addition. The resultant mixture was neutralized with 12 grams of Attapulgus clay and filtered. The material was then heated to 110° C. and steam distilled while heating to 250° C. The yield of viscous resin obtained by distillation was 164 grams, and the resin was soluble in isopropyl alcohol and compatible with zein and cellulose acetate.

It has been observed that upon the occurrence of decreased alcohol solubility, the solubility in methanol is first involved. Thus, a resin made with a too rapid addition of the aromatic compound may lose its solubility in methanol, but still retain complete solubility in ethanol and higher alcohols. With a still more rapid addition of the vinyl compound the resin may become insoluble in methanol and ethanol, but still be soluble in higher alcohols, while a still greater speed of addition will finally result in complete insolubility in alcohols. Upon reacting one mol of a phenol with slightly more than about three mols of an aromatic vinyl compound according to the methods of the present invention, the product formed is not completely soluble in methanol, but is still entirely soluble in ethanol and higher alcohols. Upon progressive increase of the molar proportions of the aromatic vinyl compound reacted, the resin produced will lose its solubility in progressively higher alcohols, until at a molar proportion of about five mols of vinyl compound to one mol of phenol the product formed is entirely insoluble in alcohol. Thus, it is clear that these phenomena progress in order, until finally, complete insolubility in alcohol has been attained, but advantage may be taken of them to produce alcohol-soluble resinous products of selective solubility in alcohols.

It will be understood that mixtures of aromatic vinyl compounds may be used generally in the practice of this invention, and likewise that the words "phenol" and "phenols" when used connotatively contemplate the various phenols and substituted phenols that may be used to produce phenol modified aromatic vinyl compounds, or which may be condensed with aromatic vinyl compounds to produce resinous products. The reaction may involve a single aromatic vinyl compound and one or more phenolic bodies, or a mixture of aromatic vinyl compounds and one or more phenolic bodies. Likewise, it will be understood that the invention is applicable not only to styrene but also generally to aromatic styrene derivative hydrocarbons, a considerable number of which are known, and various of which have been used in prior art practices for making vinyl-phenol resins.

According to the provisions of the patent statutes, I have explained the principle and mode of practicing my invention, and have described what I now consider to represent its best embodiment. I desire, however, to have it understood that, within the scope of the appended claims, the invention may be practiced otherwise than specifically described.

I claim:

1. That method of making an alcohol-soluble resinous material which comprises adding styrene progressively to an agitated heated mixture of phenol and a boron trifluoride catalyst, the amount of styrene being substantially one mol per mol of phenol, and recovering a resinous product characterized by solubility in alcohols and compatibility with cellulose acetate and zein.

2. A method according to claim 1, said catalyst being a complex of boron trifluoride and isopropyl ether.

3. That method of making an alcohol-soluble resinous material which comprises adding from about 1 to about 5 mols of styrene progressively to a mixture of phenol and a boron trifluoride catalyst while heating the mixture to about 60° to 70° C., said catalyst being present in an amount between about 0.4 and 0.6 per cent by weight of the quantity of phenol, and recovering a resinous product characterized by solubility in alcohols.

LYLE M. GEIGER.

REFERENCES CITED

The following references are of record in the file of this patent:

UNITED STATES PATENTS

| Number | Name | Date |
|---|---|---|
| 2,224,837 | Rosenthall | Dec. 10, 1940 |
| 2,247,402 | Perkins | July 1, 1941 |
| 2,315,556 | Soday | Apr. 6, 1943 |
| 2,343,845 | Powers | Mar. 7, 1944 |